April 21, 1964     K. HOTTINGER     3,130,383
FORCE MEASURING MEMBER
Filed March 12, 1963

INVENTOR.
*KARL HOTTINGER*
BY
*Attorney*

United States Patent Office 3,130,383
Patented Apr. 21, 1964

3,130,383
FORCE MEASURING MEMBER
Karl Hottinger, Darmstadt, Germany, assignor to Carl Schenck Maschinenfabrik G.m.b.H., Darmstadt, Germany, a corporation of Germany
Filed Mar. 12, 1963, Ser. No. 264,524
2 Claims. (Cl. 338—5)

This invention concerns a force measuring member comprising a measuring part of smaller cross section located between a force input part on one side and a counter-bearing part on the other side, preferably created by lateral notches.

Numerous forms of force measuring members are known, all of which operate by exploiting the knowledge that such a member experiences a change in shape under the action of a force. By using known physical laws, one can deduce the causative force from the change in shape it produces.

In the simplest case such a measuring member consists of a rod which is provided with measuring elements in the longitudinal direction (possibly also at right angles thereto), which in turn transform the change in shape of the measuring member into a measurable quantity. Electrical resistance strain gage strips of the bonded type well-known in the art are most expediently used for this purpose. However, such measuring members of rod-like structure have the disadvantage that in proportion to the causative force a change in shape of magnitude adequate to permit measurement is obtained only if the measuring member is relatively elastic. Frequently, however, this is not desirable for reasons of measuring technique.

In order to eliminate this disadvantage it has already become known how to produce a measuring part of reduced cross section in a rod-like measuring member by applying lateral holes or notches or milled slots. The measuring elements are then attached at this portion of reduced cross section. By exploiting notch stresses, a relatively high change in shape or stress is achieved at this location, referred to the change in shape of the entire measuring member. Such measuring members have the disadvantage, however, that the magnitude of notch stresses depends upon extreme sensitivity of the structural surface and the method by which the force is introduced, for example, upon the manner in which such a measuring member is installed into the overall device. Thus adequate stress prevails only over a relatively small longitudinal distance along the longitudinal axis of such a measuring member. The stress gradient in neighboring regions is so high that only a very small area with somewhat constant stress conditions is available for installing the bonded gage elements.

It is the purpose of the invention to create an arrangement which eliminates the disadvantages of known arrangements, and to create a measuring member in which the utilization of notch stress phenomena is supplemented by the utilization of a bending effect, while simultaneously creating approximately constant stress conditions over a sufficiently large longitudinal section. According to the invention, this is accomplished by providing notches in front of and behind the measuring part (viewed in the direction of the longitudinal axis of the force measuring member), extending perpendicular to the longitudinal axis, preferably intersecting the latter with their longitudinal axis, which are preferably designed symmetrically with respect to the plane defined by their longitudinal axis and the longitudinal axis of the force measuring member. In this manner, it is possible to have the strains in the measuring part extensively independent of the clamping or bearing conditions of the measuring member. It has also been determined that these advantages also apply to conditions in the notches themselves. Moreover, the region in the measuring part which exhibits approximately uniform stress conditions, and thus strain conditions, is substantially larger than in known devices, so that it is possible to install larger measuring elements, which in turn provide the advantage of more exact measurement. In addition, it is possible to install measuring elements in the notches themselves, according to the invention, in view of the uniform stress conditions prevailing there, so that a substantially higher measuring effect is achieved with equal stiffness of the entire measuring member, referred to know forms of execution.

According to experience, the application of notches according to the invention does not produce any substantial change in elasticity as compared to known forms of execution, so that the strength behavior of the measuring member is not substantially changed. Thus, as regards strength conditions, measuring members according to the invention must be regarded as at least equivalent to known members; in regard to the measuring effect, however, the members according to the invention are substantially superior to the known elements.

It is particularly expedient, primarily for reasons of manufacture, to create the notches by drilling; it is also possible, however, to provide oval notches or longitudinal slots or the like.

An exemplary form of execution of the invention is represented schematically in the drawings in which.

Figures 1, 2:
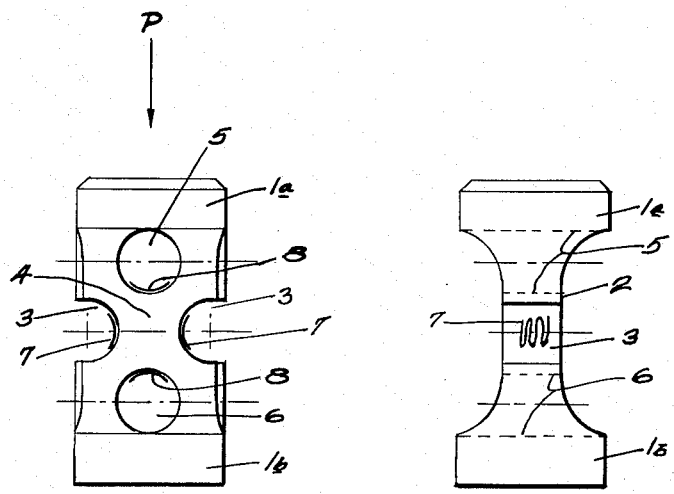
FIG. 1 illustrates a top view of the measuring member.
FIG. 2 represents a view rotated by 90° about the longitudinal axis as compared to FIG. 1.

By milling notches 2 into a cylindrical rod 1 a measuring member has been machined in which a force input member 1a and its counter-bearing part 1b introduce the force P into the measuring member proper. By the application of lateral notches 3 a measuring part 4 has been created in which relatively high stresses and strains occur as a result of notch effects. Holes 5 and 6 are provided above and below the measuring part 4, viewed in the direction of the measuring axis of the force measuring member, symmetrically with respect to the longitudinal axis of the force measuring member. In view of these holes, the force input conditions within the force measuring member 1 and its measuring part 4 have been influenced in such a way that, without decreasing the notch stress effect, a bending effect is added, and as a result a continuous stress distribution occurs in the measuring part 4 and the neighboring cross section. The design makes possible the installation of supplementary gage strips 8 in the holes 5 and 6, in addition to the known application of gage strips 7 on the measuring part 4, which results in doubling the measuring effect. The gages are connected together in a usual measuring bridge circuit well known in the art.

It will, of course, be understood that various changes in details of construction and arrangement of parts may be made by those skilled in the art without departing from the spirit of the invention as set forth in the appended claims.

I claim:

1. A force measuring member having an axis along which a force to be measured is applied, said member having a force input portion and an axially spaced counter-bearing portion connected by an intermediate axially extending strain sensitive measuring portion which has notches on opposite sides and substantially at right angles to said axis so that the cross sectional area of the notched portion is smaller than force input and counter-bearing portions to produce a notched stress effect, said member having holes above and below said notched cross sectional area and extending through said member in directions transverse to the axes of the notches to produce bending stresses, and strain gages mounted on the notched section to measure the notched stress effect and strain gages mounted in the surface of holes to measure the bending effects.

2. The combination of claim 1 in which the notches and holes are arranged symmetrically about the axis along which the force to be measured is applied.

References Cited in the file of this patent

UNITED STATES PATENTS

| | | |
|---|---|---|
| 2,796,503 | Ward | June 18, 1957 |
| 3,004,231 | Laimins | Oct. 10, 1961 |